United States Patent
Brown et al.

(12)

(10) Patent No.: US 6,227,788 B1
(45) Date of Patent: May 8, 2001

(54) SIDE LOADING TRANSPORT APPARATUS FOR SWATHERS AND THE LIKE

(75) Inventors: Keith Brown; Ken Esler; Gerry Geoffrion; Brad Harvey; Ken Peakman, all of Gravelbourg (CA)

(73) Assignee: Custom Build AG Industries Ltd., Saskatchewan (CA)

( * ) Notice: Subject to any disclaimer, the term of this patent is extended or adjusted under 35 U.S.C. 154(b) by 0 days.

(21) Appl. No.: 09/343,725

(22) Filed: Jun. 30, 1999

(51) Int. Cl.$^7$ .................................. B60P 1/24; B60P 1/43
(52) U.S. Cl. ........................ 414/480; 414/470; 414/537
(58) Field of Search ................................ 414/537, 480, 414/484, 483, 470

(56) References Cited

U.S. PATENT DOCUMENTS

| | | | |
|---|---|---|---|
| 2,705,081 | * | 3/1955 | Jacobs ................................. 414/537 |
| 3,720,336 | * | 3/1973 | Murray et al. ..................... 414/470 |
| 3,921,842 | * | 11/1975 | Campbell ..................... 414/480 X |
| 4,470,746 | * | 9/1984 | Delachapelle ..................... 414/470 |
| 4,607,996 | * | 8/1986 | Koch ..................................... 414/537 |
| 4,655,671 | * | 4/1987 | Pratt ................................. 414/480 X |

FOREIGN PATENT DOCUMENTS

| | | | |
|---|---|---|---|
| 350924 | * | 1/1961 | (CH) ..................................... 414/537 |
| 397393 | * | 1/1974 | (RU) ..................................... 414/537 |
| 94/15811 | * | 7/1994 | (WO) . |

\* cited by examiner

*Primary Examiner*—Steven A. Bratlie
(74) *Attorney, Agent, or Firm*—Nixon & Vanderhye P.C.

(57) ABSTRACT

A side loading transport apparatus for swathers and the like is disclosed comprising a transport vehicle such as a truck or a trailer with one or more load bearing ramps hingably attached along a loading edge thereof, at positions corresponding to the wheel paths of the equipment to be loaded. Each load-bearing ramp has an outboard section that is at least as long as the wheelbase of the wheeled vehicle to be loaded. The swather or equipment can then be driven up onto the load bearing ramp or ramps, and the weight of the equipment will level the load-bearing surface back down onto the transport vehicle—the ramps can be folded up or retracted and the load locked down. No hydraulic or other powered mechanical drive mechanism is needed to raise or lower the load-bearing surface during loading or unloading.

26 Claims, 5 Drawing Sheets

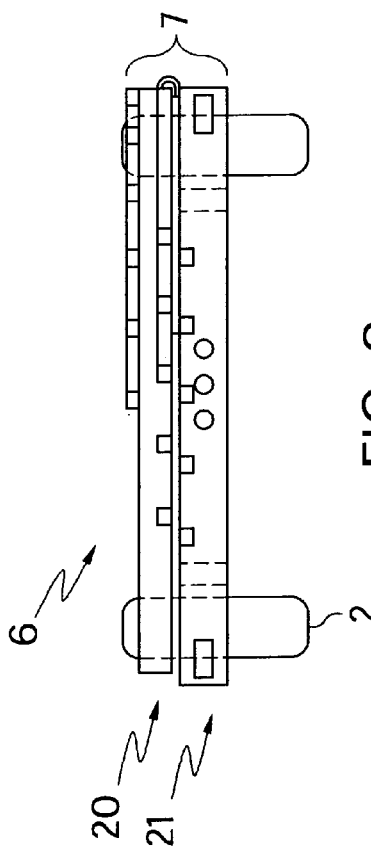
FIG. 7
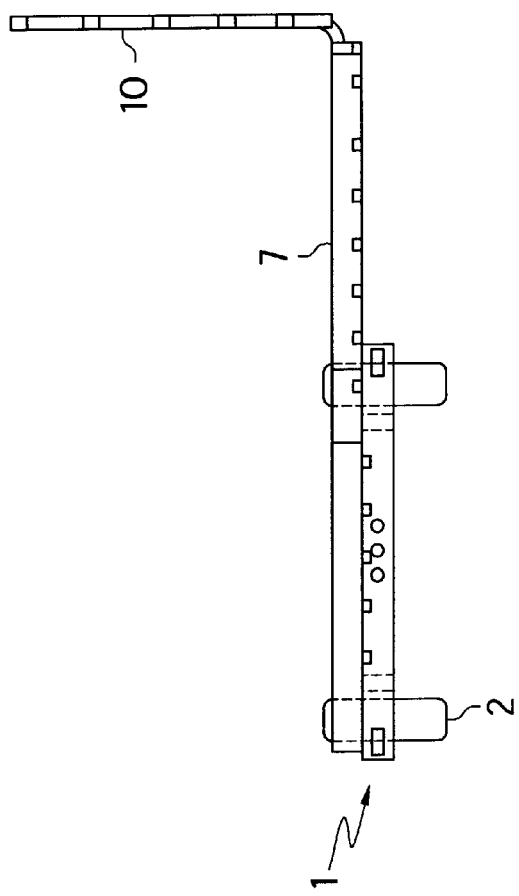
FIG. 8
FIG. 9

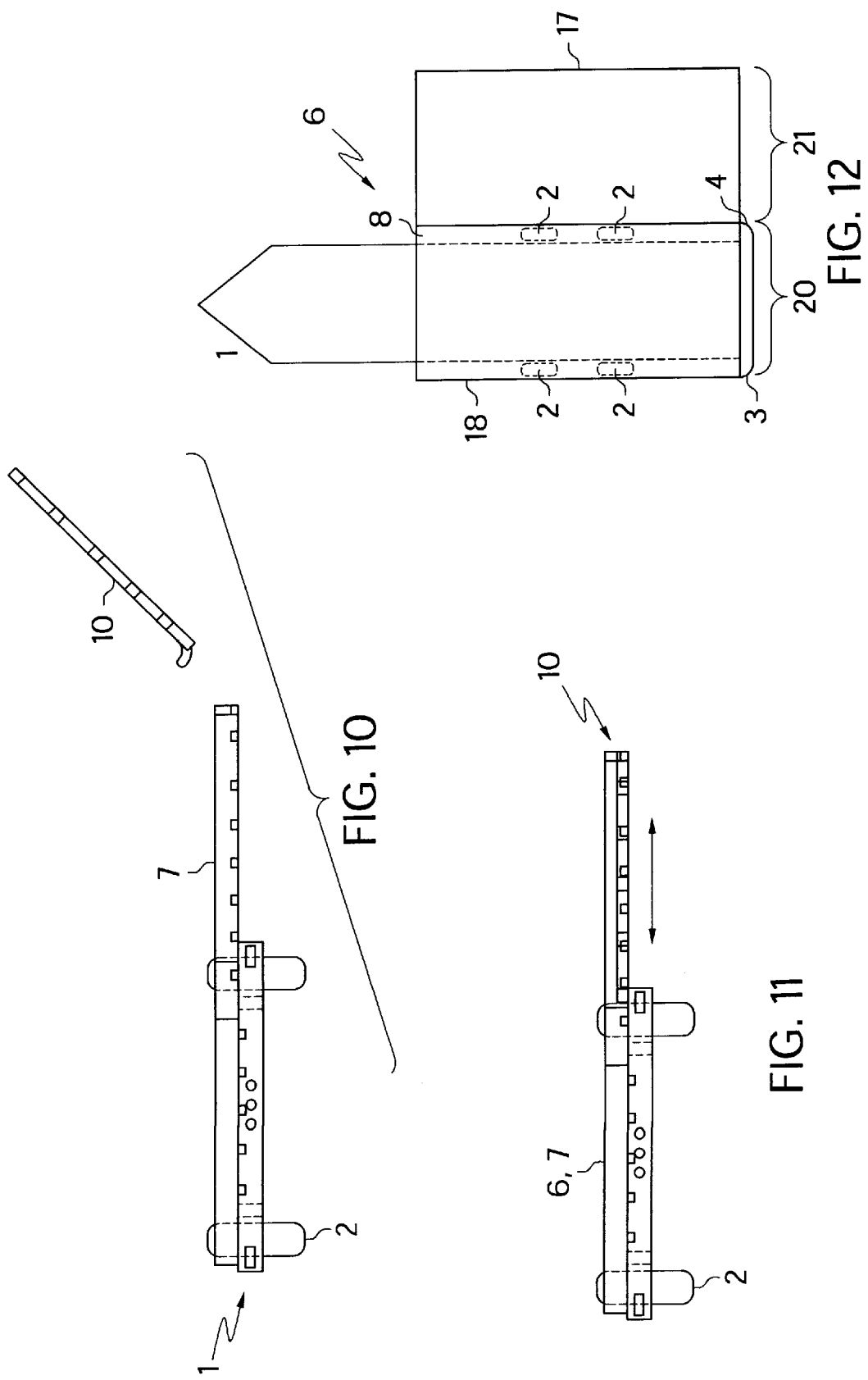

SIDE LOADING TRANSPORT APPARATUS FOR SWATHERS AND THE LIKE

This invention is in the field of transport trailers, and more particularly deals with a trailer or transport truck which can be used to transport swathers or other equipment of similar dimensions presenting similar transportation problems.

BACKGROUND

As economies of scale increase in agricultural and other operations, the use of larger or faster equipment by individual producers or custom operators to perform large amounts of processing increases. In the agricultural setting in particular, where tasks such as harvesting are carried out by a large or custom operator, safety, economy and speed of changeover between fields necessitates the rapid transport of equipment between working areas.

Self-propelled swathers and other similar equipment present a particular transportation problem. It is necessary to rapidly move them between fields by a trailer or some other similar means. The trailers are often difficult to load, or require elaborate mechanical measures to provide for a quickly loading trailer with rapidly deployable load-bearing ramps or the like.

With a wide unit such as a swather it is necessary either to remove the cutting table or wide working equipment and load it separately end to end on a trailer, and drive the propulsion unit onto a typical rear loading transport unit, for reattachment of the table or other parts at the next field, which is a labour intensive process, or alternatively it is necessary to load the entire unit end to end along the axis of the transport unit.

Several attempts have been made to provide transport trailers and equipment which allow for the rapid transport of swathers and other similar equipment end-to-end along the axis of a transport vehicle, with varying degrees of success. Where successful side-loading trailers have been built however they generally include an elaborate mechanical apparatus to tilt the loading deck of the trailer once the swather is loaded, or to tilt the deck down for unloading, or alternatively it is necessary to lift the unit in some way onto the load surface of such a flat deck unit. It would be preferable to provide a rapid side-loading apparatus for the carriage of such equipment that required no elaborate mechanical assistance for any tilting motion, and did not require any labour intensive activity to load the apparatus which in the past may have even included partial disassembly of the unit.

SUMMARY OF THE INVENTION

It is the object of the present invention to provide a side loading transport apparatus for swathers and the like which would allow for the rapid and simple loading and transport of equipment which has a wider frontal section than its depth.

The invention is a side loading apparatus to carry a wheeled vehicle in end-to-end orientation in relation to the road surface or transport vehicle. Said vehicle has a furthest forward wheel and a furthest rearward wheel, the distance between the axis of said furthest forward wheel and said furthest rearward wheel being the wheelbase of the wheeled vehicle. The path of each wheel or aligned set of wheels of said wheeled vehicle in the direction of travel of the wheeled vehicle is a wheel path.

The apparatus of the present invention itself comprises a transport having two side edges, the side edge thereof from which it is desired to load said wheeled vehicle being the loading edge and the other side edge being the far edge; a plurality of load-bearing ramps, each corresponding to a wheel path of said wheeled vehicle, hingably attached at a point along its length to the loading edge of the transport, perpendicular to said loading edge. The point of attachment of each load-bearing ramp to the loading edge of the transport is the hinge point of that ramp. The end of the load-bearing ramp to the outside of the loading edge and furthest from the far edge of the transport is the loading end of each load-bearing ramp, and the opposite end, past the hinge point and towards the far edge of the transport, is the far end of said load-bearing ramp.

The section of each load-bearing ramp between the hinge point and the loading end is the outboard section of said load-bearing ramp, and the section of said load-bearing ramp between the hinge point and the far end is the inboard section of said load-bearing ramp. The outboard section of each load-bearing ramp, whether it be collapsible or otherwise possible to shorten, will in its operating mode be at least as long as the wheel base of the wheeled vehicle to be carried by the apparatus.

Each load-bearing ramp can hingably move between a transport position resting on top of the side edges and a loading position wherein said load-bearing ramp is tilted down at its loading end to the ground. The movement of the weight of the wheeled vehicle between the outboard section and inboard section of the load-bearing ramp(s) tilts the load-bearing ramp(s) between their transport and loading positions.

By manufacturing the outboard section of each load-bearing ramp to be at least as long as the wheelbase of the wheeled vehicle to be loaded, all of the wheels of the wheeled vehicle will be engaged by one or another of the load-bearing ramp(s) before the weight of the wheeled vehicle moves across the loading edge of the transport onto the inboard sections of the load-bearing ramps and causes the tilting of the load-bearing ramp(s) into the transport position. The movement of the weight of the wheeled vehicle, even where the wheeled vehicle is weighted heavily at the front, will cause the tilted transport loading of the entire wheeled vehicle including the rearward end of the wheeled vehicle, even where the rearward end of the wheeled vehicle still remains on the outboard sections of one or more of the load-bearing ramps. This is different from attempts to produce side loading transports in the past which have involved the loading of the front end only of a swather or other similar piece of equipment, and the rear wheel(s) of the swather was allowed to ride on the road surface.

The apparatus of the present invention could be made flexible enough to accommodate wheeled vehicles of varying sizes or wheelbases by rendering the outboard section of the load-bearing ramps long enough to accommodate the longest possible wheelbase of a wheeled vehicle to be carried, and smaller vehicles would also be accommodated.

The outboard section of the load-bearing ramp(s) could also be rendered foldable so that it could be folded onto the inboard section of the ramp(s) for storage or movement of the transport apparatus of the present invention in an unloaded state.

Transport locks could also be added to the apparatus of the present invention which would be used to lock the load-bearing ramps into their transport position when the apparatus is loaded. Clamps or other types of locking mechanisms known in the art could be used.

The furthest forward and furthest rearward wheels of the wheeled vehicle might be substantially aligned in the same wheel path. This would be the case where a vehicle for example had four wheels, two rear wheels and two forward wheels, each of which pair of rearward and forward wheels were either directly aligned from front to back of the vehicle or were closely enough aligned that it made sense to define only a single wheel path with that pair of wheels, said wheel path then being defined by the outermost edge of the outermost wheel and the innermost edge of the innermost wheel, for loading onto the apparatus of the present invention using, in the case of the vehicle with two pairs of such wheels, two load-bearing ramps. Alternatively, the furthest forward and furthest rearward wheels of the wheeled vehicle might be in separate wheel paths and might each engage a separate load-bearing ramp.

Another improvement which could be made to the basic embodiments of the invention would be to add shock absorbing means which would have the effect of cushioning the movement of the load-bearing ramps between their respective transport and loading positions. One or more shock absorbers could be used. One or more shock absorbers might be attached to each load-bearing ramp. Alternatively, in an embodiment wherein the load-bearing ramps were connected together for joint movement, it may even be possible to use less than one shock absorber for each load-bearing ramp.

Where the wheeled vehicle to be loaded has more than one wheel path and thus more than one load-bearing ramp is used, the load-bearing ramps might be linked together such that they move in conjunction with each other. Where the load-bearing ramps were linked together they might be linked together by a single ramp connecting member, or by some other method. It will be understood, however, that they might also move independently of each other and that both such configurations are contemplated within the scope of the present invention.

The transport on which the apparatus of the present invention is used might be a trailer, or alternatively the apparatus could also be mounted on the frame of a truck or other transport vehicle.

An extensible outer end section could be added to the outboard section of one or more load-bearing ramps. The extensible outer end section might be made extensible in various ways, including collapsing the section by removing it from the remainder of the load-bearing ramp, collapsing it by folding towards the transport and/or up towards the wheeled vehicle stowed on the apparatus, or collapsing by rendering the extensible outer section telescopic within a storage opening at the loading end of the load-bearing ramp.

In another embodiment of the invention, a side loading apparatus is disclosed to carry such a wheeled vehicle in end-to-end orientation, said apparatus comprising a transport having two side edges, the side edge thereof from which it is desired to load said wheeled vehicle being the loading edge and the other side edge being the far edge; wheels on the transport for moving said transport along the ground; and a load-bearing ramp wide enough to accept all of the wheels of said wheeled vehicle, said load-bearing ramp being hingably attached to the loading edge of the transport such that said load-bearing ramp tilts downwards towards the ground along the loading edge of said transport, the point of attachment of said load-bearing ramp to the loading edge being a hinge point, the end of the load-bearing ramp to the outside of the loading edge being the loading end from which the wheeled vehicle will be moved onto the load-bearing ramp, and the opposite end thereof being the far end, the section of said load-bearing ramp between the hinge point and the loading end being the outboard section of said load-bearing ramp and the section of said load-bearing ramp between the hinge point and the far end being the inboard section of said load-bearing ramp; wherein the outboard section of the load-bearing ramp is at least as long as the wheelbase of said wheeled vehicle; and wherein said load-bearing ramp can hingably move between a transport position resting on top of the side edges, and the loading position wherein said load-bearing ramp is tilted down at its loading end to the ground. The movement of the weight of the wheeled vehicle between the outboard and inboard sections of the load-bearing ramp will be the actuating force required to switch the load-bearing ramp between its loading and transport positions.

The outboard section of the load-bearing ramp could be made to fold onto the inboard section of the load-bearing ramp when the apparatus was not loaded, in order to decrease the width of the unloaded apparatus.

A transport lock might be added to lock the load-bearing ramp in the transport position. Again, a shock absorbing means might be also added to cushion the movement of the load-bearing ramp between the transport and loading positions. Again, one or more shock absorbers of varying types might be used. The shock absorbers used might be a shock absorbing hydraulic cylinder, a spring or another type of shock absorbing means. It will be understood that for this invention wherever the reference is made to the use of a shock absorbing apparatus, any of these types of apparatus are contemplated within the scope of the present invention.

The outboard section of the load-bearing ramp might include an extensible outer end section which could be collapsed once the apparatus was loaded with a wheeled vehicle, or while unloaded. The extensible outer section might be collapsed by removal thereof from the remainder of the load-bearing ramp, by folding the extensible outer end section towards the transport and/or up towards the wheeled vehicle stowed on the apparatus, or by telescoping into or out of a storage opening at the loading end of the ramp.

Again, this embodiment could either be used on a trailer, truck or other transport vehicle.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 7 shows the top view of FIG. 5, with the addition of a third load-bearing ramp to the apparatus to engage a third wheel path;

FIG. 8 demonstrates a folding outboard section of the load-bearing ramp;

FIGS. 9 to 11 demonstrate an extensible outer end section at the end of the load-bearing ramp and three methods of rendering said section extensible;

FIG. 12 is a top view of another embodiment of the apparatus of the present invention wherein a single load-bearing ramp is used.

DETAILED DESCRIPTION OF THE ILLUSTRATED EMBODIMENTS

Figure 1:
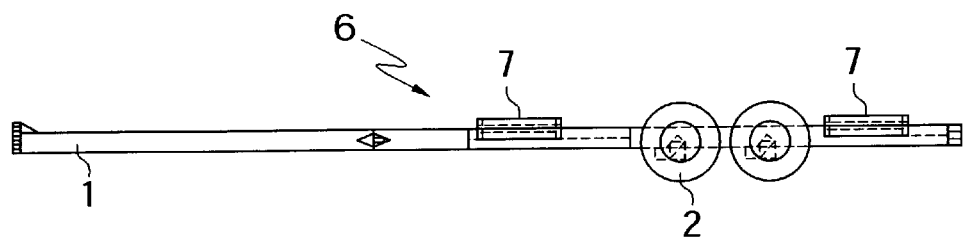
FIG. 1 is a side view of one embodiment of the apparatus of the present invention, wherein the transport is a trailer.
Figure 2:
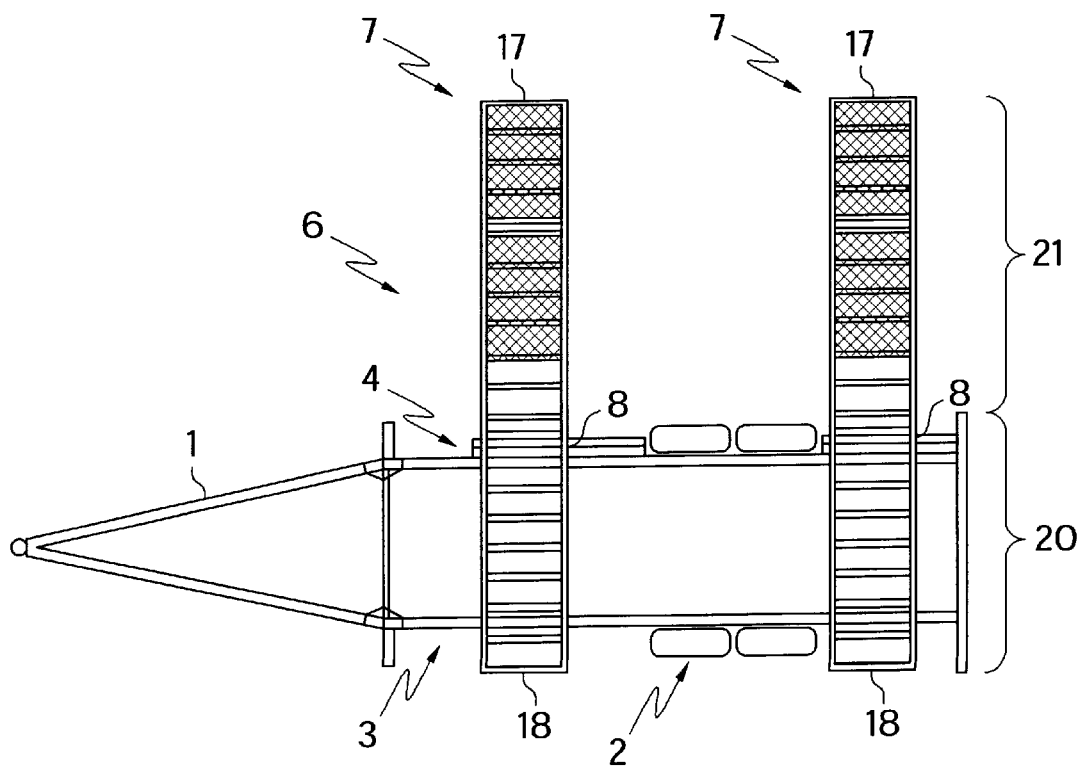
FIG. 2 is a top view of the apparatus of FIG. 1.

As described above, the invention is a side loading apparatus to carry a wheeled vehicle such as a swather or the like, where the dimensions of the vehicle are such that it is more convenient to transport the vehicle for lengthy distances down a road aligned in an end-to-end direction along the road, rather than simply driving the implement straight down the road. It will be understood that, in addition to swathers, other similarly shaped types of equipment could also be transported using the apparatus of the present invention and the transport of all such other types of equipment are contemplated within the scope of the present invention.

It is desirable to describe in more detail the key elements of the wheeled vehicle which the apparatus of the present invention is intended to transport in an end-to-end direction along a road. Reference will be made to the side view of FIG. 3, as well as the top views of FIGS. 6 and 7, in describing such wheeled vehicle. The wheeled vehicle (11), such as a swather, sprayer or other piece of equipment, which is wider than it is deep, has a front end (26) and a back end (27). A wheeled vehicle (11) which it is intended to transport on the apparatus might have any number of axles and/or wheels. Each wheel of the wheeled vehicle (11) has a path of travel in the direction of travel (25) of the wheeled vehicle. This wheel path (16) is defined by the width of the wheel in question. Where two or more wheels, which might be positioned at differing places from front to back of the machine (11), are approximately close to each other in their horizontal spacing across the width of the machine, a single wheel path might be defined by the outer edge of the outermost such wheel and the inner edge of the innermost such wheel. For example, in the apparatus shown from the top in FIG. 6, there are four wheels on the swather, being two furthest forward wheels (12) and two furthest rearward wheels (13). Each pair of a forward wheel (12) and rearward wheel (13) defines a single wheel path (16), thus showing two wheel paths (16) in total. Alternatively, the apparatus shown from the top in FIG. 7 has three wheels, namely two furthest forward wheels (12) and one furthest rearward wheel (13), the furthest rearward wheel (13) in this case also being used to steer the swather (11). In that case, three wheel paths (16) are shown.

The wheelbase of the wheeled vehicle is defined by the furthest forward wheel (12) and the furthest rearward wheel (13).

The furthest forward wheel (12) might be at the front end (26) of the swather (11), or it might be spaced back some distance from the front end (26) of the wheeled vehicle (11). Similarly, the furthest rearward wheel (13) might be located all the way at the back end (27) of the wheeled vehicle (11), or alternatively may be located some distance forward thereof. While the overall apparatus obviously needs to be sized and manufactured of strength and dimension to accommodate varying dimensions of the wheeled vehicle (11), it will be understood that the positioning of the furthest forward wheel (12) and the furthest rearward wheel (13) in relation to the front and back ends (26) and (27) of the wheeled vehicle (11) is not directly material to the overall operability of the invention and any such variations are contemplated with the scope of the present invention.

The apparatus of the present invention might also be used to move a wheeled vehicle (11) that moved on tracks rather than on wheels. Each track of the tracked vehicle would define a wheel path (16), and the wheel base of the wheeled vehicle (11) would be defined by the length from front to back of the longest track.

Turning to FIGS. 1 to 6, there is shown one embodiment of the apparatus (6) of the present invention.

The apparatus (6) is attached to a transport (1), which transport (1) in this case is a trailer. The transport (1) might be a truck, trailer or the like. The transport (1) has wheels (2) which engage the ground and are used to move the transport (1) along the ground. The apparatus (6) has two side edges, one of which edges is a far edge (3) and the other edge is the loading edge (4) from which it is desired to load the wheeled vehicle (11) onto the apparatus (6).

There is one load-bearing ramp (7) for each wheel path (16) of the implement or wheeled vehicle which it is desired to transport. In this particular embodiment two load-bearing ramps (7) are shown.

Each load-bearing ramp (7) is hingably attached to the loading edge (4) of the apparatus (6) at a point along the length of the ramp (7). The point of attachment of the load-bearing ramp (7) to the transport (1) is the hinge point (8). Each ramp (7) is attached perpendicular to the loading edge (4), such that a load placed on said load-bearing ramp(s) (7) will be carried in an end-to-end configuration in relation to the road and the transport (1).

The end of each load-bearing ramp (7) to the outside of the loading edge (4) is the loading end (17) from which the wheeled vehicle will be moved onto the load-bearing ramp (7). The opposite end thereof is the far end (18). The section of each load-bearing ramp (7) between the hinge point (8) and the loading end (17) is the outboard section (21) of the load-bearing ramp (7) and the section of the load-bearing ramp (7) between the hinge point (8) and the far end (18) is the inboard section (20) thereof.

Each load-bearing ramp (7) is hingably moveable between a transport position and a loading position. The transport position of the load-bearing ramp(s) (7) is where the ramp(s) (7) rest on top of the side edges (3) and (4) of the transport (1) and approximately define a horizontal plane. The loading position of said load-bearing ramps (7) would be where the ramps (7) were tilted down at their loading ends (17) to the ground or road surface, the far end thereof (18) then moving upwards and away from the far edge (3) of the transport (1).

Generally speaking, it will be understood that the load-bearing ramps (7) might all be of the same size and have approximately reflective hinge points (8). However, it will be understood that it might also be possible to use more than one load-bearing ramp (7) of a different size, or move the hinge points (8) on the various load-bearing ramps, to accommodate a particular wheeled vehicle (11) to be carried.

The load-bearing ramps (7) will be moved between their loading and transport positions by the movement of the weight of a wheeled vehicle (11) from the outboard section (21) to the inboard section (20) thereof. For example, where the load-bearing ramps (7) are in their tilted loading position, the driving of a wheeled vehicle (11) up the load-bearing ramps (7) past the hinge point (8) onto the inboard section (20) of the load-bearing ramps (7), will result in the tilting into transport position of the load-bearing ramps (7) and their load. Conversely, to unload the wheeled vehicle (11) from the load-bearing ramps (7), the weight of the wheeled vehicle (11) just needs to be shifted back along the load-bearing ramps (7) off of the inboard section (20), past the hinge point (8) and onto the outboard section (21), which will shift the weight and result in the tilting of the ramps (7) to the ground at their loading ends (17).

One of the main advantages of the apparatus of the present invention is that no mechanical assistance is required to load or unload the wheeled vehicle from the apparatus (6). Specifically, each load-bearing ramp (7) would tilt into its transport position without mechanical assistance when the weight of the wheeled vehicle moved past the hinge points (8) of the ramps (7).

In the embodiment of FIGS. 1 to 7, the load-bearing ramps (7) shown are constructed using two side rails joined by a plurality of track members therebetween. It will be understood, however, that various configurations or materials could be used in the construction of the load-bearing ramps (7) and that insofar as such configurations or materials all accomplish the same goal of providing a surface upon which a wheel or wheels can be driven, all such configurations or construction methods are contemplated within the scope of the present invention.

Figure 3:
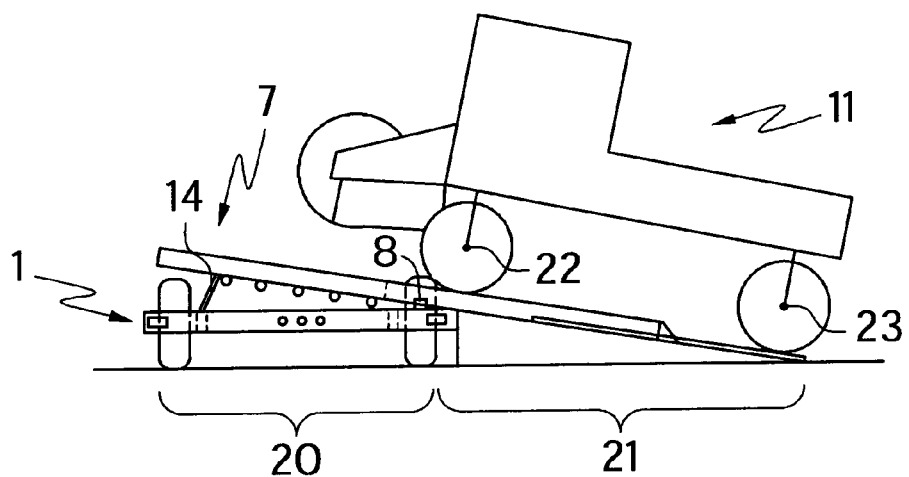
FIG. 3 shows a swather being loaded onto the apparatus of FIG. 1, the load-bearing ramps being in the loading position.
Figure 4:
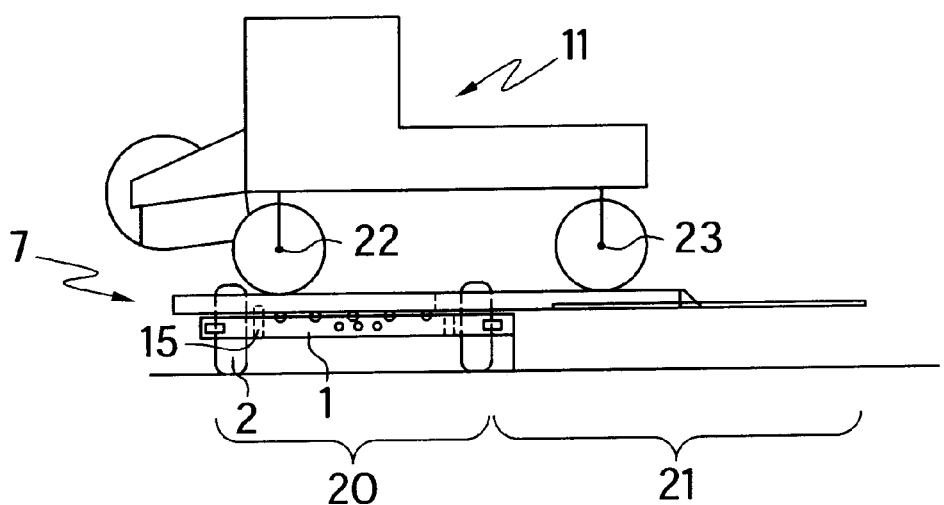
FIG. 4 demonstrates the swather and apparatus of FIG. 3, the load-bearing ramps being in the transport position.

FIGS. 3 and 4 demonstrate the loading of this basic embodiment of the present invention. In FIG. 3, the load-bearing ramps (7) have been tilted into their loading position and a wheeled vehicle (11), in this case a swather, is driven onto said load-bearing ramps (7). As the furthest forward wheel (12) moves over the hinge point (8) and the weight of the vehicle (11) moves onto the inboard sections (20) of the ramps (7), the load-bearing ramps (7) will tilt down into their transport position. Once the load-bearing ramps (7) are in their transport position, demonstrated in FIG. 4, they can be locked by a transport lock (15).

While the outboard section (21) of the load-bearing ramp (7) needs to be at least as long as the wheelbase of the wheeled vehicle (11) for loading purposes, the entire length of the ramp(s) (7) will not necessarily be required during the transport of the wheeled vehicle (11), once it is loaded. The collapsible outer end ramp section (10) will be discussed in more detail below, but for descriptive purposes at this point it will be seen that the collapsible outer end section (10) could be any section of the load-bearing ramp(s) (7) that would still leave the length of the load-bearing ramp(s) (7) from the far end (18) at least as long as the wheelbase of the wheeled vehicle (11).

A transport lock (15) is demonstrated in FIG. 4. Any apparatus or mechanism capable of locking the load-bearing ramps (7) into the transport position when level with the edges (3) and (4) is contemplated within the scope of the invention as a possible transport lock (15). Clamps, locks or other methods known in the art could be used as the transport locking mechanism (15).

Also shown in FIG. 3 are shock absorbers (14) attached to the load-bearing ramps (7). The shock absorbers (14) will cushion the movement of the load-bearing ramps (7) between the transport and loading positions. The shock absorbing means (14) might be any type of a shock absorbing cylinder, spring or other apparatus which would soften the movement of the load-bearing ramps (7) in their tilting into or out of the transport position when weight was applied to either end of the load-bearing ramps (7). It will be understood that any such type of shock absorber is contemplated within the scope of the present invention.

The outboard section (21) of each load-bearing ramp (7) should be at least as long as the wheelbase of the wheeled vehicle (11). This is so that the rearward wheel (13) will be engaged by the load-bearing ramps (7) before the forward wheel (12) moves across the hinge point (8) onto the inboard section (20) causing the tilting of the load-bearing ramp (7) into transport position.

Figure 6:
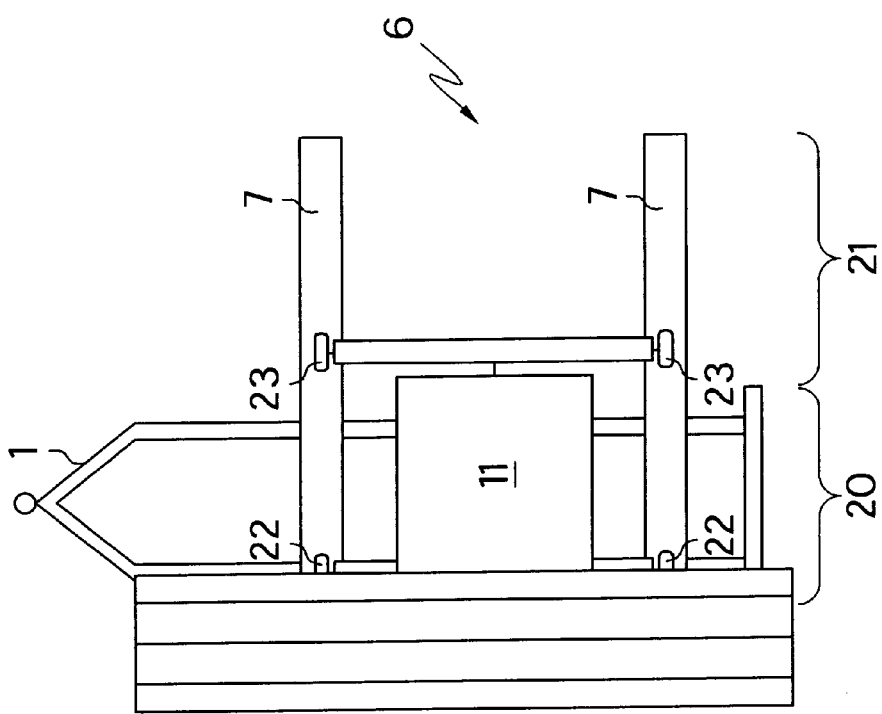
FIG. 6 shows the top view of FIG. 4 with the swather fully loaded.
Figure 5:
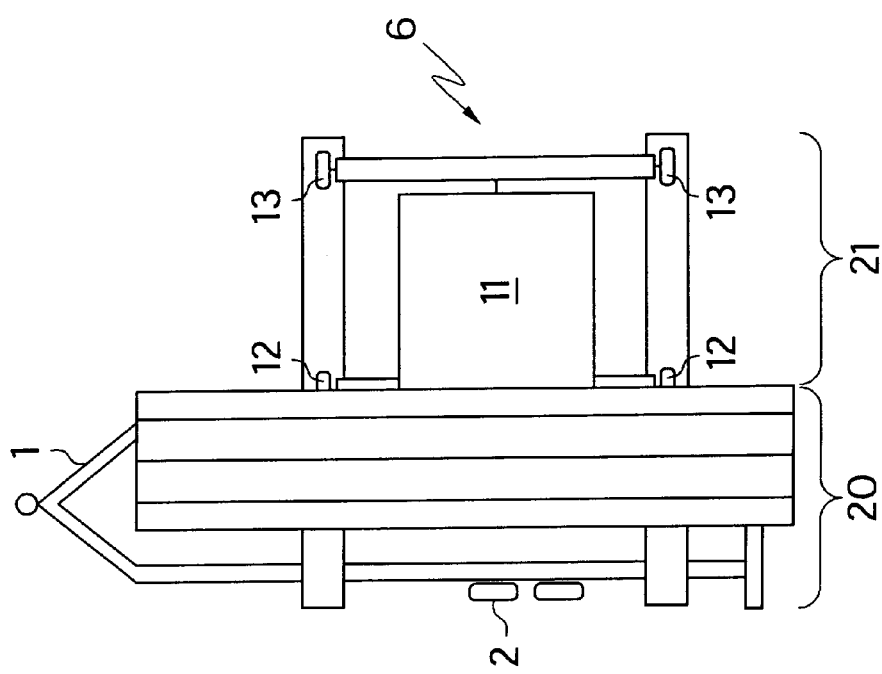
FIG. 5 is a top view of the loading of the swather in FIG. 3, as the swather is partially loaded.

The swather (11) of FIGS. 5 and 6 demonstrates the concept of substantial alignment of forward and rearward wheels in a single wheel path.

FIG. 7 demonstrates a swather (11) that has a separate wheel path for the rearward wheel (13), necessitating the addition of a third load-bearing ramp (7). Also shown in FIG. 7 is a ramp connecting member (19) which is used to connect the three load-bearing ramps (7) of that embodiment of the apparatus of the present invention so that they move together. Specifically, when the two forward wheels (12) of the swather (11) of that embodiment move across the hinge point onto the inboard section (20) of their respective ramps (7), the linking together of the three ramps (7) by the ramp connecting member (19) will cause the centre ramp on which the rearward wheel (13) is engaged to tilt forward into transport position at the same time as the two outer ramps on which the two forward wheels (12) are engaged. The application of weight to the load-bearing ramps (7) on either side of the hinge point (8) would be communicated to all ramps (7) via the ramp connecting member (19).

It will be understood that the linking together of the load-bearing ramps (7) with the ramp connecting member (19) such that they move in conjunction with each other is not necessary to the broadest concept of the present invention, but it does provide an added benefit where enacted. It will be understood also that while this Figure demonstrates the use of a single ramp connecting member (19) to link the load-bearing ramps (7) in conjunction with each other, that other means are possible to link the load-bearing ramps (7) together so that they would move in conjunction with each other and that all such means and adaptations to the apparatus of the present invention which might be required to effect such linking and conjunctive movement are contemplated within the scope of the present invention.

FIG. 8 demonstrates an additional modification which can be made to the apparatus of the present invention. Specifically, the outboard section (21) of the load-bearing ramp(s) (7) can be rendered foldable at or near the hinge point (8) so that the outboard section (21) can be folded back over the inboard section (21) for storage when the unit is not in use, to decrease the width of the unloaded trailer. The outboard section could also be rendered removable rather than foldable, to accomplish the same result, and it will be understood that any such modification is contemplated within the scope of the present invention.

As is demonstrated in FIGS. 1 to 8, in an embodiment of the apparatus of the present invention having more than one load-bearing ramp (7), the load-bearing ramps (7) could be placed on either side of the wheels (2) of the transport (1). The transport wheels (2) could, in actual fact, protrude above the top surface of the load-bearing ramps (7), so long as the underbody clearance of the wheeled vehicle (11) was appropriate, and this would succeed in lowering the overall profile of the loaded apparatus (6) so that the load would be less top-heavy and more safe.

The apparatus shown in the Figures demonstrates a transport (1) being a trailer. The trailer could be pulled by a truck or other piece of equipment. Alternatively, where desired, the transport which was used to attach the apparatus (6) to might be a truck or other piece of equipment. It will be understood that any such power unit or pull unit is contemplated within the scope of the present invention.

FIGS. 9 to 11 demonstrate an extensible outer end section (10) at the end of the load-bearing ramp (7). The outer end section (10) can be collapsed, either when the wheeled vehicle (11) is fully loaded onto the apparatus of the present invention, or alternatively when the apparatus is not in use. As demonstrated in FIGS. 9 to 11, there are various means of rendering the outer end section (10) extensible. FIG. 9 demonstrates a foldable outer end section (10) which can be folded up in the direction of the load on the apparatus. FIG. 10 demonstrates a removable outer end section (10), which is an alternative to a foldable extensible outer end section (10). FIG. 11 demonstrates a telescoping outer end section (10) which is extensible by sliding into or out of a storage receptacle at the loading end (17) of the load-bearing ramp (7). These three methods will be considered demonstrative of various ways in which the outer end section (10) could be rendered extensible or removable to reduce the width of the unit when loaded or unloaded. The outer end section (10) might only be needed during loading or unloading of the apparatus (6).

FIG. 12 shows another embodiment of the apparatus of the present invention wherein a single load-bearing ramp is used. A single load-bearing ramp (7) which is wide enough to accept all of the wheels of said wheeled vehicle (11) is shown. This single load-bearing ramp (7) is hingably attached to the loading edge (4) of the apparatus (6).

The end of the load-bearing ramp (7) to the outside of the loading edge (4) is the loading end (17), from which the wheeled vehicle (11) will be moved onto the load-bearing ramp (7). The opposite end thereof is the far end (18). The section of the load-bearing ramp (7) between the hinge point (8) and the loading end (17) is the outboard section (21) of the load-bearing ramp (7) and the section of the load-bearing ramp (7) between the hinge point (8) and the far end (18) is the inboard section (20) of the load-bearing ramp (7). The outboard section (21) of the load-bearing ramp (7) is at least as long as the wheelbase of the wheeled vehicle (11). The load-bearing ramp (7) can hingably move between a transport position resting on top of the side edges (3) and (4) and a loading position wherein the load-bearing ramp (7) is tilted with loading end (17) to the ground.

Similar to the embodiments of FIGS. 1 to 11, the outboard section (21) of the embodiment of FIG. 12 could also be made to fold onto the inboard section (20) when the apparatus (6) is not loaded. A transport lock could also be used with this embodiment as with the others.

Shock absorbing means could also be added to this embodiment, like the others, to cushion the movement of the load-bearing ramp (7) between the transport and loading positions.

The outboard section (21) of the load-bearing ramp (7) could include an extensible outer end section (10) which would be collapsed once the apparatus was loaded or unloaded. The extensible end section (10) of this load-bearing ramp (7) could be rendered extensible in numerous ways, including removal, folding or telescopic movement.

The wheels (2) of the transport could be made to extend above the surface of the inboard section (20) of the load-bearing ramp (7) in the transport position by the creation of wheel openings (24) in the inboard section (20). Provided that the wheels of the wheeled vehicle (11) were spaced appropriately horizontally across the frontal section of the wheeled vehicle (11) and that the underbody clearance of the wheeled vehicle (11) was appropriate, the wheeled vehicle could be driven up over top of the wheels (2) protruding through the wheel openings (24), and the profile of the overall unit could be lowered.

Thus it can be seen that the invention accomplishes all of its stated objectives. The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

We claim:

1. A side loading apparatus to carry a wheeled vehicle, said wheeled vehicle having a furthest forward wheel and a furthest rearward wheel, the distance between the axis of said furthest forward wheel and said furthest rearward wheel being the wheelbase of the wheeled vehicle, the path of each wheel or aligned set of wheels of said wheeled vehicle being a wheel path, said apparatus comprising:

a) two side edges, being a loading edge and a far edge;

b) wheels on said apparatus for moving said apparatus along the ground in a direction of travel of the apparatus; and c) a plurality of load-bearing ramps, each load-bearing ramp corresponding to a wheel path of the wheeled vehicle and being hingably attached at a hinge point along its length to the loading edge of the apparatus perpendicular to said loading edge, wherein the end of said load-bearing ramp to the outside of the loading edge is the loading end, and the opposite end is the far end, the section of each load-bearing ramp between the hinge point and the loading end being the outboard section and the section between the hinge point and the far end being the inboard section of said load-bearing ramp;

wherein the outboard section of each load-bearing ramp is at least as long as the wheelbase of said wheeled vehicle;

and wherein each load-bearing ramp can hingably move between a transport position resting on top of the side edges and a loading position wherein said load-bearing ramp is tilted down at its loading end to the ground or loading surface;

wherein the movement of the weight of the wheeled vehicle between the inboard and outboard sections of the load-bearing ramps causes the tilting of the load-bearing ramps between the transport and loading positions.

2. The apparatus of claim 1 wherein the outboard section of a load-bearing ramp folds onto the inboard section of said load-bearing ramp when said apparatus is not loaded.

3. The apparatus of claim 1 further comprising transport locks to lock the load-bearing ramps in the transport position.

4. The apparatus of claim 1 further comprising shock absorbing means to cushion the movement of the load-bearing ramps between the transport and loading positions.

5. The apparatus of claim 1 wherein the load-bearing ramps are linked together so that they tilt in conjunction with each other.

6. The apparatus of claim 5 wherein the load-bearing ramps are linked together by a ramp connecting member.

7. The apparatus of claim 1 wherein the outboard section of one or more load-bearing ramps includes an extensible outer end section.

8. The apparatus of claim 7 wherein said extensible outer end section is removable from the remainder of said load-bearing ramp.

9. The apparatus of claim 7 wherein said extensible outer end section folds.

10. The apparatus of claim 9 wherein said extensible outer end section is folded up towards the wheeled vehicle stowed on said apparatus.

11. The apparatus of claim 7 wherein said extensible outer end section telescopes into or out of a storage opening at the loading end of said load-bearing ramp.

12. The apparatus of claim 1 wherein the number of load-bearing ramps is more than one.

13. The apparatus of claim 12 wherein the number of load-bearing ramps is two.

14. The apparatus of claim 12 wherein the number of load-bearing ramps is three.

15. The apparatus of claim 12 wherein the wheels of said apparatus are between two of said load-bearing ramps.

16. The apparatus of claim 15 wherein the tops of the wheels are above the tops of the load-bearing ramps in their transport position.

17. A side loading apparatus to carry a wheeled vehicle, said wheeled vehicle having a furthest forward wheel and a furthest rearward wheel, the distance between the axis of said furthest forward wheel and said furthest rearward wheel being the wheelbase of the wheeled vehicle, said apparatus comprising:

a) two side edges, being the loading edge and the far edge;
   b) wheels on said apparatus for moving along the ground; and
   c) a load-bearing ramp wide enough to accept all of the wheels of said wheeled vehicle, said load-bearing ramp being hingably attached at a hinge point along its length to the loading edge of the transport, the end of the load-bearing ramp to the outside of the loading edge being the loading end, and the opposite end thereof being the far end, the section between the hinge point and the loading end being the outboard section of said load-bearing ramp and the section between the hinge point and the far end being the inboard section of said load-bearing ramp;

wherein the outboard section of the load-bearing ramp is at least as long as the wheelbase of said wheeled vehicle and the inboard section terminates at the far edge;

and wherein said load-bearing ramp can tilt between a transport position resting on top of the side edges and a loading position wherein said load-bearing ramp is tilted down at its loading end to the ground.

18. The apparatus of claim 17 wherein the outboard section folds onto the inboard section when said apparatus is not loaded.

19. The apparatus of claim 17 further comprising a transport lock to lock the load-bearing ramp in the transport position.

20. The apparatus of claim 17 further comprising shock absorbing means to cushion the movement of the load-bearing ramp between the transport and loading positions.

21. The apparatus of claim 17 wherein the outboard section includes an extensible outer end section.

22. The apparatus of claim 21 wherein said extensible outer end section is removable from the remainder of said load-bearing ramp.

23. The apparatus of claim 21 wherein said extensible outer end section folds towards and away from the transport.

24. The apparatus of claim 23 wherein said extensible outer end section is folded up towards the wheeled vehicle stowed on said apparatus.

25. The apparatus of claim 21 wherein said extensible outer end section telescopes into or out of a storage opening at the loading end of said ramp.

26. The apparatus of claim 17 wherein the wheels of said apparatus extend above the surface of the inboard section of the load-bearing ramp in the transport position.

\* \* \* \* \*